(12) United States Patent
Aizpuru et al.

(10) Patent No.: US 11,619,824 B2
(45) Date of Patent: Apr. 4, 2023

(54) SELECTABLE OFFSET IMAGE WEDGE

(71) Applicant: Optex Systems, Inc., Richardson, TX (US)

(72) Inventors: Jose Joaquin Aizpuru, Tehachapi, CA (US); Rodney Doster, Garland, TX (US); Danny Robert Schoening, Allen, TX (US); Ryan Little, Richardson, TX (US)

( * ) Notice: Subject to any disclaimer, the term of this patent is extended or adjusted under 35 U.S.C. 154(b) by 22 days.

(21) Appl. No.: 17/373,815

(22) Filed: Jul. 13, 2021

(65) Prior Publication Data

US 2021/0341746 A1     Nov. 4, 2021

Related U.S. Application Data

(63) Continuation of application No. 16/035,374, filed on Jul. 13, 2018, now Pat. No. 10,324,298.

(51) Int. Cl.
| | |
|---|---|
| *G02B 27/09* | (2006.01) |
| *F41G 1/00* | (2006.01) |
| *G02B 26/08* | (2006.01) |
| *G02B 7/18* | (2021.01) |

(52) U.S. Cl.
CPC ........... *G02B 27/0905* (2013.01); *F41G 1/00* (2013.01); *G02B 26/0891* (2013.01); *G02B 7/1805* (2013.01)

(58) Field of Classification Search
CPC .. G02B 27/0905; G02B 27/09; G02B 27/106; G02B 27/1073; G02B 26/0891; G02B 26/00; G02B 26/08; G02B 26/0808; G02B 26/0816; G02B 26/0875; G02B 26/0883; G02B 7/1805; F41G 1/00

USPC .......... 42/120, 129, 133, 138, 137, 136, 140
See application file for complete search history.

(56) References Cited

U.S. PATENT DOCUMENTS

| | | | | |
|---|---|---|---|---|
| 3,948,587 | A  * | 4/1976 | Rubbert | G01C 3/04 |
| | | | | 359/422 |
| 5,793,525 | A  * | 8/1998 | Sabin | G02B 21/24 |
| | | | | 359/368 |
| 8,363,321 | B1 * | 1/2013 | Pochapsky | F41G 1/44 |
| | | | | 359/557 |
| 8,749,887 | B2 | 7/2014 | Jahromi | |
| 9,164,269 | B1 | 10/2015 | Jahromi | |
| 9,335,124 | B2 * | 5/2016 | Maryfield | G02F 1/13362 |
| 9,417,037 | B2 * | 8/2016 | Jahromi | F41G 1/38 |
| 9,644,920 | B2 | 5/2017 | Jahromi | |
| 10,180,565 | B2 * | 1/2019 | Havens | G02B 27/283 |
| 10,254,083 | B2 * | 4/2019 | Jahromi | F41G 1/38 |
| 10,324,298 | B1 * | 6/2019 | Aizpuru | G02B 27/36 |

(Continued)

*Primary Examiner* — John Cooper
(74) *Attorney, Agent, or Firm* — Melito Law

(57) ABSTRACT

The invention discloses a selectable offset image wedge assembly and various methods for making and for use with any optical system having a circular lens and an objective, comprising a housing with a rear-facing end that mounts onto the objective and a forward-facing end with a circular wedge lens mounted therein that is coaxially aligned with the circular lens of the optical system, wherein, the wedge is adjustable to any predetermined clocking position after detachment from the optical system, allowing quick and repeated reattachment to the optical system to an approximately exact vertical orientation of a first image produced by the wedge lens and a second image produced by the circular lens of the optical system.

12 Claims, 10 Drawing Sheets

(56) References Cited

U.S. PATENT DOCUMENTS

| | | | |
|---|---|---|---|
| 2005/0039370 A1* | 2/2005 | Strong | G02B 23/14 |
| | | | 42/130 |
| 2006/0109544 A1* | 5/2006 | Greenslade | F41G 3/326 |
| | | | 359/353 |
| 2008/0043322 A1* | 2/2008 | Sauter | F41G 11/003 |
| | | | 359/363 |
| 2013/0083396 A1* | 4/2013 | Pretorius | G02B 27/646 |
| | | | 359/557 |
| 2016/0116254 A1* | 4/2016 | Jahromi | F41G 11/00 |
| | | | 42/122 |
| 2016/0356572 A1* | 12/2016 | Jahromi | F41G 1/38 |
| 2019/0360780 A1* | 11/2019 | Jahromi | F41G 1/38 |
| 2021/0222999 A1* | 7/2021 | Baker | G02B 23/16 |
| 2021/0310767 A1* | 10/2021 | Baker | F41G 1/545 |

* cited by examiner

SELECTABLE OFFSET IMAGE WEDGE

CROSS REFERENCE TO RELATED APPLICATIONS

This application is a continuation-in-part of U.S. Pat. No. 10,324,298 and claims priority to U.S. Pat. No. 10,324,298, filed Jul. 13, 2018. The entire contents of U.S. Pat. No. 10,324,298 are incorporated herein by reference.

BACKGROUND OF THE INVENTION

The overwhelming majority of older bore-sighted rifle scopes do not feature an objective thread. Most accessories available do not require a thread to be mounted, because the older assemblies were placed on the outer side of the objective using some kind of clamp or on an extended rail. The objective thread is a thread that is on the interior of a riflescope objective and is located in front of the lens. Not all modern riflescopes have an objective thread, either. Whether or not to include an objective thread is up to the manufacturer based on the expected equipment to be used on a particular scope objective, like for example, sunshades, flip-up covers, kill flashes, masks or offset image wedges.

The invention discloses a selectable offset image wedge, a method of adjusting it, and a method of making it for use with a bore-sighted scope having a circular lens and an objective thread, comprising a housing with a threaded rear-facing end that screws into said objective thread and a forward-facing end with a circular wedge lens mounted therein that is coaxially aligned with; wherein, the wedge is subsequently rotatably adjustable to any predetermined clocking position after detachment from the scope, allowing quick and repeated reattachment to the scope to a selectable offset location of an image. The now widespread use of objective threads existent on thousands of different articles of manufacture necessitates a new approach to mounting accessories on scopes and like products.

SUMMARY OF THE INVENTION

The visible Field of View (FOV) of any scope mounted on a rifle is limited by the design and specification of the scope itself. The FOV can be maximized by setting the scope to the minimum magnification and, alternatively, can be minimized by setting the scope to the maximum magnification. The give or take for this adjustment is enhanced FOV versus target recognition. The trajectory of any projectile is affected by gravity from the moment it is fired; although quite repeatable, the impact of this gravitational pull on the projectile increases exponentially as the projectile travels. The limitation of the FOV can play a very important role in how far a scope can effectively see the target. For example, let's take the case of a typical scope/rifle pairing. The FOV is projected from the scope onto a target a known number of yards away, seen as a circle of viewing area when viewed from the scope. It is shown as a shaded area within a clock. The line of departure of the projectile (horizontal line simulating an extended barrel) is linear approximately centered within that circle and runs parallel to the line of sight, which is the centerline of the scope FOV. These two lines, in a typical scope/rifle pairing, run parallel and are offset by a very small distance, typically less than two inches, as they are stacked on each other. Imagine a curved trajectory line superimposed on the FOV, defining the projectile drop. It is apparent that once the trajectory reaches a certain distance, it falls out of the FOV. It is critical to note that the functional FOV is shown by the range of the arrows, which means that the entire area above the line of departure serves no functional purpose for the user with respect to where the projectile will hit.

In an effort to improve the usable FOV across a larger portion of the overall range, a user can intentionally offset the FOV by mounting the scope such that it points downward relative to the line of departure. Here the line of departure and the line of sight are no longer parallel, offset mechanically by mounting the scope onto the rifle using a tapered wedge which lifts the back of the scope. The impact of this tapered wedge mount and how the FOV is shifted at the target, increases the functional FOV dramatically. In this specific case, using a mechanical wedge with a downward tilt will cause a shift of the FOV toward the 6 o'clock position. The shifted image at the scope will now allow the user to target something at a given distance that before was not within the previous FOV.

The present invention relates to a very specific image shift using one of many potential specific wedge designs. The wedge used in this invention is one that is made of two pieces of glass, they are not the exact same physical shape of glass, they do not have the same index of glass, and they are not used as distinct elements. In one embodiment, the pieces of glass are bonded together to form an assembly in a very specific rotational position relative to each other. The choice of glass and shape are easily defined by someone experienced in the art such that, when present in the optical path of a scope, the resulting image shift is selected relative to a given radial distance, and when rotated along the axis of the scope, the image revolves around the center of the FOV with the exact same amount of rotation of the wedge assembly itself. This "bonded" wedge assembly will hereinafter simply be referred to as a "wedge".

Advantages of the Invention

The many objects and advantages of the present invention will become apparent to those skilled in the art by examples of various preferred embodiments. They should be reviewed along with the attached drawings wherein like reference numerals refer to like components throughout. The variously described embodiments of the present invention have many advantages, but the invention is not limited by only the embodiments described herein. Although the present invention will be described in considerable detail with reference to certain preferred embodiments thereof, other alternative embodiments are possible. Therefore, the spirit and scope of the claims should not be limited to the description of the preferred embodiments, nor the alternative embodiments, and examples contained herein, and to ensure sufficient antecedent basis for all types of claims in the specification, this application recites below the originally filed claims:

1. A selectable offset image wedge assembly for use with an optical system having a circular lens and an objective, comprising:
    a housing with a rear-facing end that mounts on said objective using an adapter ring, a forward-facing end with a circular wedge mounted therein that is coaxially-aligned with and has a smaller diameter than the lens of the optical system, and a locking ring for locking the wedge to the adapter;
    wherein the optical system receives an image and an offset of said image because the outer periphery of the lens of the optical system collects a ray bundle unimpeded by the wedge and the center circular section of the lens of the optical system corresponding to the diameter of the wedge collects an offset ray bundle of said image that has passed through the wedge;

wherein the wedge is adjustable to allow the offset of said image produced by the offset ray bundle to be aligned vertically with the image produced by the unimpeded ray bundle and locked into place using the locking ring at a specific clocking position associated with said vertical alignment;

and further wherein, the wedge is adjustable to any predetermined clocking position after detachment from the optical system, allowing quick and repeated reattachment to the optical system to any predetermined clocking position.

2. The selectable offset image wedge assembly of claim 1, wherein said objective is threaded, and said adapter ring is threaded on at least one side and screws into said objective thread.

3. The selectable offset image wedge assembly of claim 1, wherein said wedge is threaded on at least one side, said locking ring is threaded, and said adapter ring is threaded on at least one side; and said locking ring and said threaded wedge screw onto said threaded adapter ring.

4. The selectable offset image wedge assembly of claim 1, wherein said objective is threaded, said wedge is threaded on at least one side, said locking ring is threaded, and said adapter ring is threaded on at least one side; and said adapter ring screws onto said objective thread, and said locking ring and said threaded wedge screw onto said threaded adapter ring.

5. The selectable offset image wedge assembly of claim 1, wherein at least one more circular wedge is coaxially aligned and mounted to said forward facing end of said wedge assembly and produces at least one more offset image.

6. The selectable offset image wedge assembly of claim 2, wherein at least one more circular wedge is coaxially aligned and mounted to said forward facing end of said wedge assembly and produces at least one more offset image.

7. The selectable offset image wedge assembly of claim 3, wherein at least one more circular wedge is coaxially aligned and mounted to said forward facing end of said wedge assembly and produces at least one more offset image.

8. The selectable offset image wedge assembly of claim 4, wherein at least one more circular wedge is coaxially aligned and mounted to said forward facing end of said wedge assembly and produces at least one more offset image.

9. The selectable offset image wedge assembly of claim 5, wherein said wedge and said at least one more circular wedge are adjustable independently.

10. The selectable offset image wedge assembly of claim 6, wherein said wedge and said at least one more circular wedge are adjustable independently.

11. The selectable offset image wedge assembly of claim 7, wherein said wedge and said at least one more circular wedge are adjustable independently.

12. The selectable offset image wedge assembly of claim 8, wherein said wedge and said at least one more circular wedge are adjustable independently.

13. A method of mounting at least one selectable offset image wedge for repeated use with an optical system having a circular lens and an objective, comprising the steps of:

a. mounting said at least one wedge adjacent said objective;
b. mounting a locking mechanism onto an adapter;
c. aligning an optical system reticle with a vertical line in a field of view using a rifle at a fixed position;
d. mounting said at least one wedge onto the adapter;
e. adjusting said at least one wedge to align an image of the vertical line with a vertical axis of the reticle;
f. adjusting the locking mechanism against a wedge cell to provide a positive stop when said at least one wedge is loosened and locked in the fixed position; and
g. locking the locking mechanism.

14. A method of making a selectable offset image wedge for use with an optical system having a circular lens and an objective, comprising the following steps:

a. polishing two plates of glass to an approximately same size and shape, said two plates having a first side and a second side defined by a direction of transmitted light;
b. combining said two plates in opposite directions, such that said transmitted light enters the first side and second side and exits the second side and first side of said two plates, respectively, with no separation of color;
c. then a first of said two plates is cut into circular form for tight insertion into a cell;
d. then a second of said two plates is cut into circular form slightly smaller than the first and placed adjacent the first at a tilt within the cell to avoid interference of said transmitted light;
e. then the two plates are bonded together using cement and collimated red and blue light, forming a cemented wedge, said cement being cured while two color images are superimposed one on the other;
f. the cell is then positioned between a collimated target and a theodolite with an index mark aligned vertically in the direction of transmitted light;
g. then the cemented wedge is aligned in the cell such that a target is displaced only on a vertical axis, forming a selectable offset image wedge; and
h. the selectable offset image wedge is then bonded in place.

BRIEF DESCRIPTION OF THE DRAWINGS

FIG. 17*a* shows an example scope with known windage and the target is the dot 902 at the origin and bullet 901 hits at 'X'.

FIG. 23 shows the FOV as a result of the setup in FIG. 21; and finally, FIG. 24 depicts the FOV as a result of the setup in FIG. 22.

DETAILED DESCRIPTION OF SOME PREFERRED EMBODIMENTS

Figure 6:
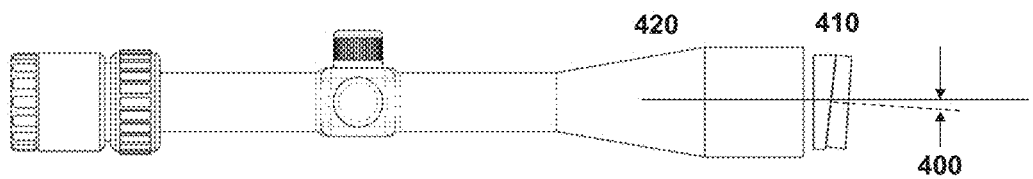
FIG. 6 shows the impact of a wedge 410 and how the Field of View (FOV) is shifted at the target, shifting the functional FOV dramatically as shown by arrows 400.
Figure 7:
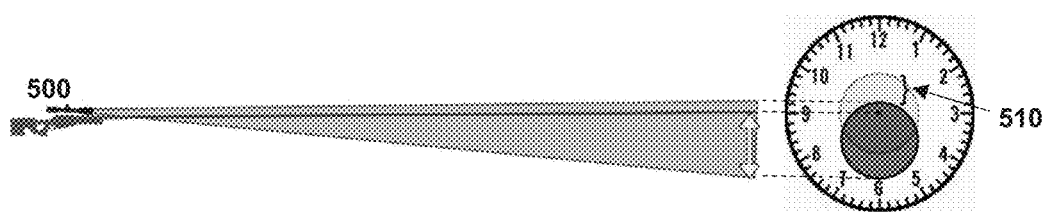
FIGS. 7 and 8 show how the shifted image at the scope 500 now allows the user to target something at a given distance that, prior to insertion of the wedge FIG. 6, 410, was not within the FOV.
Figure 8:
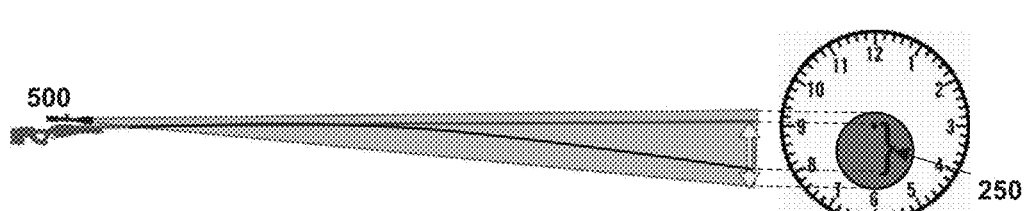
Figure 9:
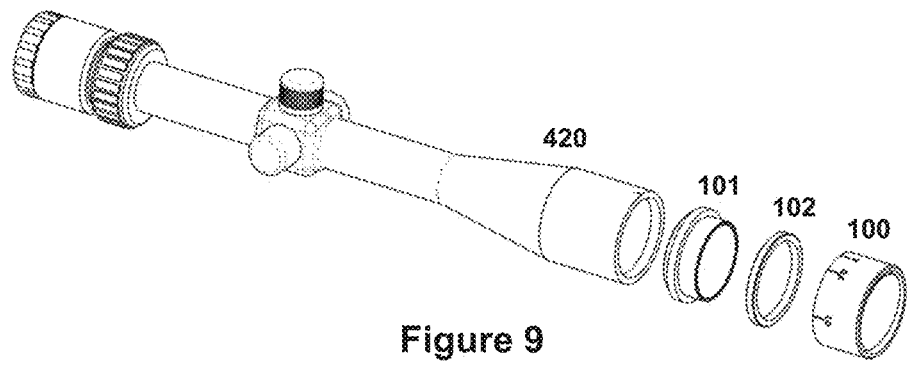
FIG. 9 is an exploded view of an example scope 420 to be used with the wedge 100, adapter ring 101 and locking ring 102.

FIG. 6 shows an example scope 420 with a wedge 410 placed directly in front of the objective. The wedge is located rotationally such that the overall thinnest section of the wedge is located directly at the downward position. The FOV shift 400 can be designed to be various degrees of movement; in this case, the wedge shown has a shift of 20 minutes of angle (MOA), hence it is obvious that the FOV SHIFT shown in FIG. 6 is exaggerated. At 100 yards, a 20 MOA shift is 20 inches using the standard that 1 MOA is 1 inch for every 100 yards.

Figure 13A:
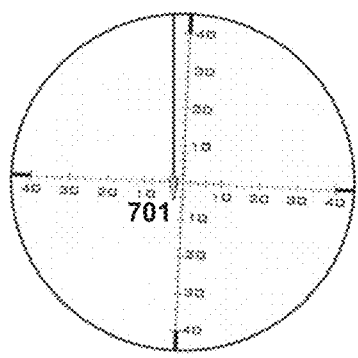
FIGS. 13*a*, 13*b* and 13*c* depict the sequential steps for achieving plumb from FIG. 13*a*, 701 to FIG. 13*b*, 702, then achieving center from FIG. 13*b*, 702 to FIG. 13*c*, 703 when aligning example scope 420 to the plumb initially used for rifle setup.
Figure 13B:
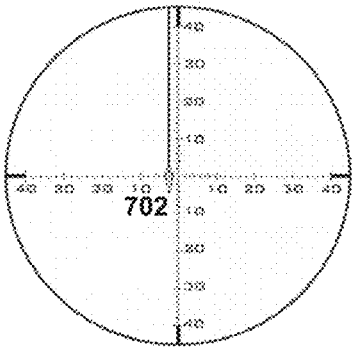
Figure 13C:
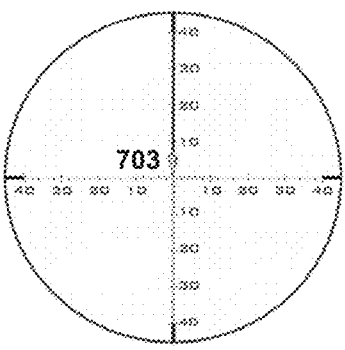

Suppose, by way of example, that a plumb bob is placed at a distance of 100 yards from the scope 420 described in FIG. 6 and a rifle (not shown) is sighted through the scope. The reticle used in the scope is shown in FIGS. 13*a*, *b*, and *c* is marked with MOA. The intent is to center the tip of the plumb bob to the origin and to ensure the scope/rifle pair are plumb to the world. FIG. 13*a*, 701 shows that the scope itself is not plumb to the world because the plumb line and reticle line do not run parallel to each other; this means the scope needs to be rotated slightly. FIG. 13*b* shows that the scope is now rotated to the correct position 702, because the plumb and reticle lines run parallel to each other. However, the target is still not centered, because the tip on the bob is located low and to the left of origin of the reticle. FIG. 13*c* shows the plumb bob once the scope is moved to effectively center the tip of the plumb bob onto the origin 703.

Figure 1:
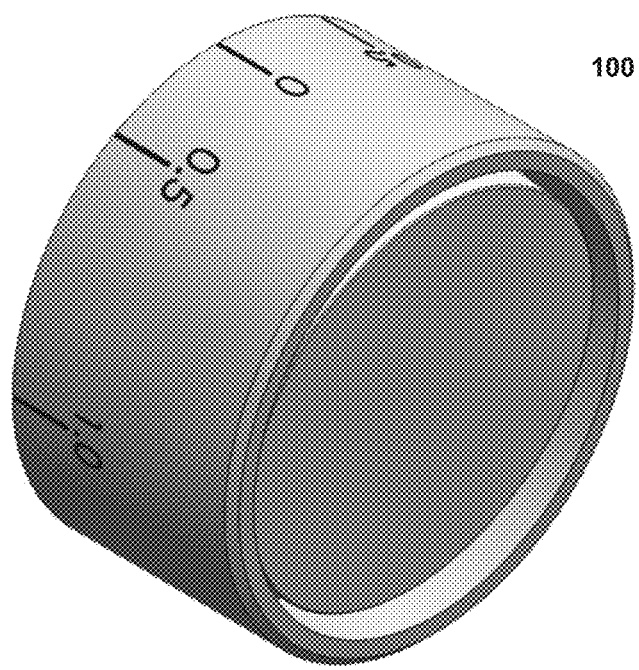
FIG. 1 is a perspective view of an exemplary embodiment of a selectable offset image wedge 100 showing clock markings around its exterior.
Figure 2:
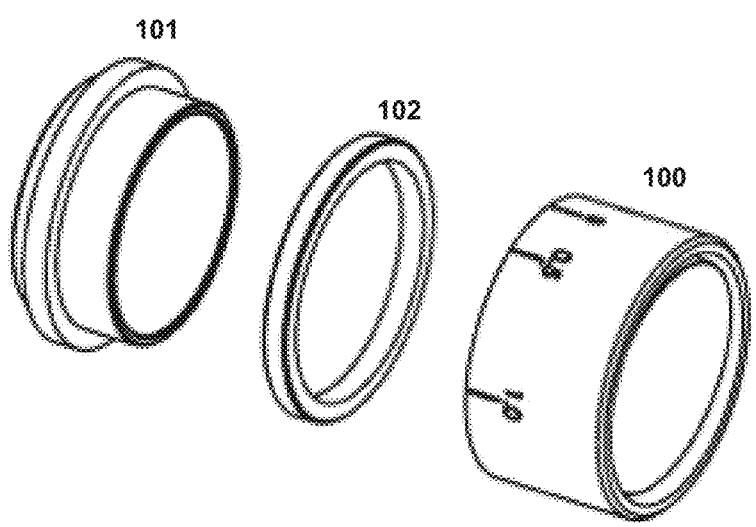
FIG. 2 is a perspective view of an exemplary embodiment of a selectable offset image wedge assembly, showing clock markings around the threaded wedge 100 exterior, the threaded adaptor ring 101 and the threaded locking ring 102 of a preferred embodiment, although non-threaded embodiments of the invention are also contemplated.
Figure 3:
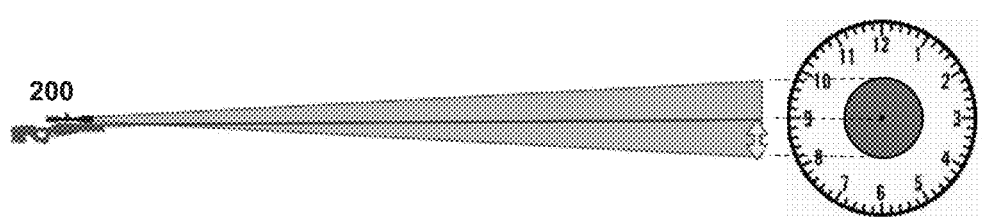
FIG. 3 depicts a typical scope/rifle pairing 200.
Figure 4:
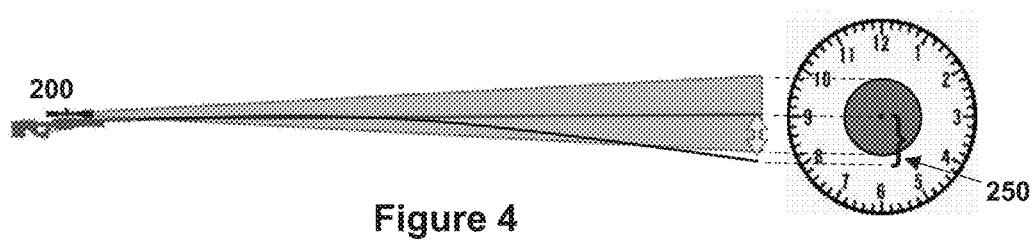
FIG. 4 depicts the projectile drop 250 after a certain distance.
Figure 5:
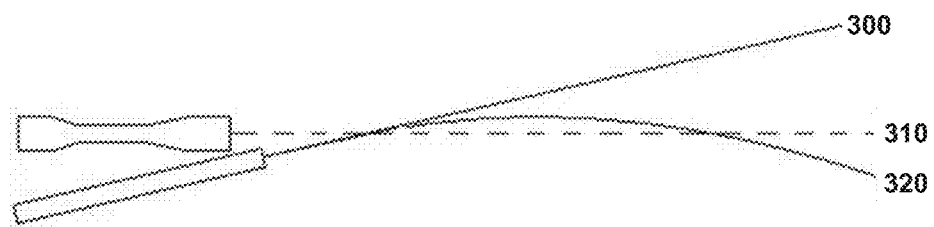
FIG. 5 shows an example where the line of departure 300 and the line of sight 310 are no longer parallel.
Figure 14A:
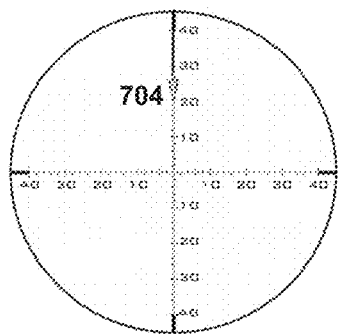
FIG. 14*a* depicts the offset of image 704 using 20 Minute of Angle (MOA) wedge 410 in FIG. 14*b*.
Figure 14B:
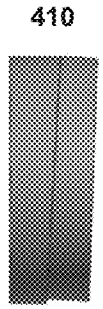
FIG. 14*c* depicts a 40 MOA offset image 705 using a 40 MOA wedge 411 in FIG. 14*d*.
Figure 14C:
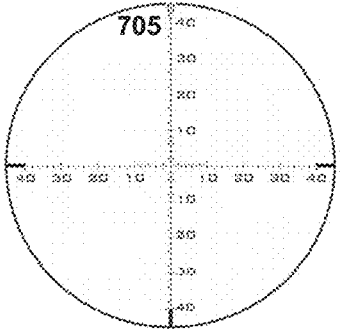
Figure 14D:

A wedge 410 is introduced to the scope 420 by means of a threaded adapter ring, FIG. 2, 101. FIG. 14*a* shows what the FOV is with the wedge in the correct rotational position; FIG. 14*b* is a wedge with a 20 MOA design. For the sake of variation, FIG. 14*c* shows what the FOV is with a 40 MOA wedge in the correct rotational position and 14*d* shows a wedge with a 40 MOA design. Note that the new center of the FOV is 20 MOA and 40 MOA lower in each of the two wedges introduced, respectively, as the stationary plumb bob appears to move upward.

Figure 15A:
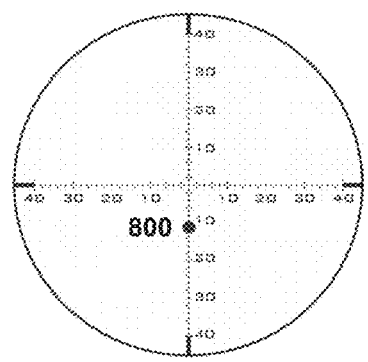
FIG. 15*a* depicts an example scope using a 20 MOA wedge at reticle position of 11 MOA down (800).
Figure 15B:
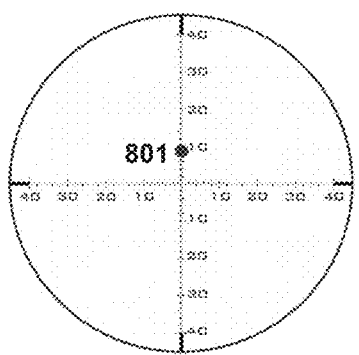
FIG. 15*b* depicts an example scope using a 40 MOA wedge at reticle position of 9 MOA up (801).

A user experienced in the art of ballistics knows and documents the projectile drop at various distances for various calibers. For example, if a user with the reticle/scope setup described previously finds a target at 1000 yards and he knows that the bullet drop with the ammunition he is using is 31 MOA, he can choose to use either of the wedges described, 20 or 40 MOA. FIGS. 15*a* and 15*b* show what a targeted scope would show on the 20 MOA and 40 MOA wedges respectively. FIG. 15*a* achieves 31 MOA by knowing the wedge shifts the image 20 MOA and the user raises the rifle an 11 additional MOA to account for the total 31 MOA drop. In FIG. 15*b*, 31 MOA is achieved by lowering the rifle 9 MOA with a 40 MOA wedge. These ideal scenarios assume that gravity is the only variable impacting the projectile; of course, it is up to the user to understand and adjust for other factors.

Setting Up a Wedge

In FIG. 6, it is noted that the plumb bob is now located at 20 MOA relative to the scope/rifle setup process shown in FIGS. 13*a* thru 13*c*, with 13*c* being the final step in preparation for introducing the wedge. Once the wedge is threaded onto the scope all the way until the threads run to a stop, it is not a given as to where the image will end up, but the end goal is shown in FIG. 14*a* with a 20 MOA wedge.

Figure 16:
FIG. 16 shows unique plumb bob images (802, 803 & 804), representing three different, yet sequential, rotational stops that may be seen as the goal of reaching the 804 position.
Figure 16:
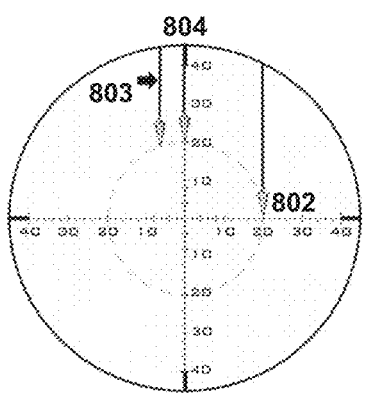

FIG. 16 shows three unique plumb bob images simulating three different rotational stops within the full 360-degree clock circle. Bob position 802 will be the starting point in this example of where the image, as seen through the scope, is located when the threads came to a mechanical stop. The final bob position needs to be at position 804 so, as the wedge is backed out slowly from its current stop position, the image will revolve in a clockwise (CW) radial 20 MOA pattern depicted by the dashed circle centered on the origin. Viewing through the scope, near the final position as shown in bob position 803, continue to rotate the wedge in a CW fashion until the bob and plumb line lay directly on top of the reticle line shown in position 804. If the plumb line and bob go too far, it can certainly be rotated counter clockwise (CCW) to return to position 804. This mating position of wedge rotation relative to scope housing is critical and requires a marker to indicate location once the plumb bob is no longer available to the user beyond the setup phase. During this process to mark the final wedge location for 20 MOA bullet drop, the shooter decided to mark not only the final location where the plumb bob is shown at position 804 (12 o'clock on FIG. 16) but also the other three clocking locations at 3, 6, and 9 o'clock (note that only the 3 o'clock bob is shown in FIG. 16). As a result, and in this specific case, the wedge has four markings to indicate exactly 90 degrees of rotation relative to each other so that those markings can be matched up with the one on the scope for any of the four settings discussed. This is a very sensitive rotational setting and must be done with caution to achieve the expected results, especially as target distances fall in the ranges of 1000 to 4000+ yards. At extreme distances a wedge of higher MOA would be necessary, such as 100 MOA.

Once the wedge and scope relative rotational position is marked, it would be beneficial to add a thread locking compound in cases where:
1) the wedge would be in place for a long time; or
2) for additional assurance that the wedge is secure in that location.

Other Alternative Embodiments

Elevation and windage travel ranges on scopes vary by manufacturer. Elevation tends to necessitate more total range than windage in most applications. In cases of large distances with small winds present or extreme wind at even small distances, some scopes don't have the necessary adjustment capability built in. One way to simulate additional travel for windage is with a wedge.

Figure 17A:
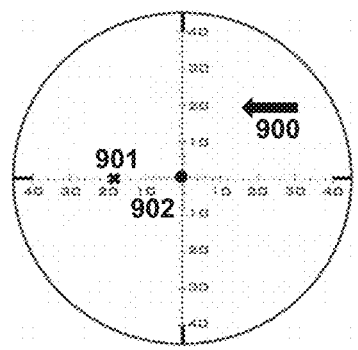
FIG. 17*a* shows a sequence of events that depict an example of image and resulting locations of bullets as a wedge and scope are adjusted to center a target into a FOV with a known wind direction (shown by an arrow).

An example of a windage adjustment application for a wedge is shown in FIGS. 17a-d. An ideal case with no gravitational effect will be considered here in an effort to focus on the impact of wind alone. FIG. 17a shows a scope targeted onto an image with a known wind direction 900 (right to left as shown) and known speed (converts to 18 MOA effect). The shooter understands the impact of the wind and under normal circumstances, the windage adjust on this scope is manufactured with less range than what would be required to compensate for the 18 MOA necessary. If the shooter shoots at this moment, the projectile will land 18 MOA to the left at 901, indicated by the "X" located 18 MOA to the left of center (target). The target location is indicated by the circle at 902, currently centered on the scope reticle as there is no wedge effect yet.

Figure 17B:
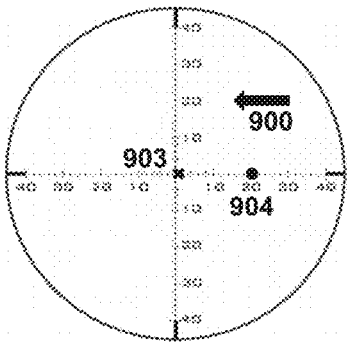
FIG. 17*b* shows an example scope with known windage using a 20 MOA wedge prior to rifle movement and target is at dot 904 at 20 MOA to the right and bullet 903 hits at "X".
Figure 17C:
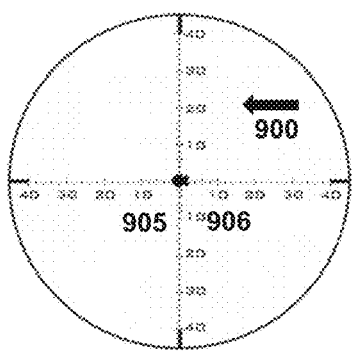
FIG. 17*c* shows an example scope with known windage using a 20 MOA wedge after rifle movement and target is a dot 905 at origin and bullet hits at "X" 906 offset by 2 MOA 900.
Figure 17D:
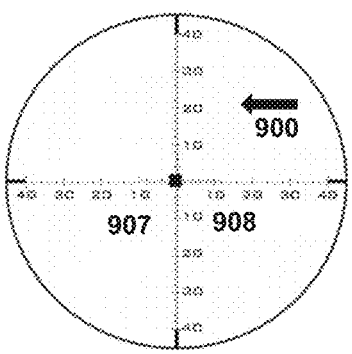
FIG. 17*d* shows an example scope with known windage using a 20 MOA wedge after rifle movement with reticle adjust 900 and target is a dot 907 and bullet hits at "X" 908, both at origin.

The shooter can now add a wedge with the understanding that, at some point, he has to move the rifle to the right to be able to hit the target if the wind remains constant. Prior to moving the rifle from the position at FIG. 17a, the wedge is added such that the clocking position ends at the mark combination on the scope and wedge made earlier to result in the image being located at position 802 in FIG. 16, or at approximately the travel end of the mechanical stop in the threads. This is shown in FIG. 17b. If the circle in the new image comes up short of being in the exact position, approximately one CW rotation of the wedge as seen through the scope should get the shooter back to position 802. If the shooter shoots at this moment, the projectile will land at the same point relative to the target as FIG. 17a because the rifle has not been adjusted yet for the offset. That shot is now shown as an "X" at a point 18 MOA to the left of the target but now 2 MOA to the right of the origin, shown at 903. Of course the original target is now shifted 20 MOA to the right at 904 because of the wedge effect.

The next adjustment to this wedge application comes in the form of moving the rifle to get the target back on center of reticle origin. The rifle is moved 20 MOA to the right so that target appears at the origin at 905. If the shooter shoots at this moment, the projectile will land just to the right of the origin at 2 MOA at 906. The final adjustment to be made would be to move the scope reticle over the 2 MOA to the right such that the reticle now is located where any subsequent projectile would hit. This 2 MOA is necessary because of the 20 MOA wedge value compared to the 18 MOA wind impact.

Figure 18:
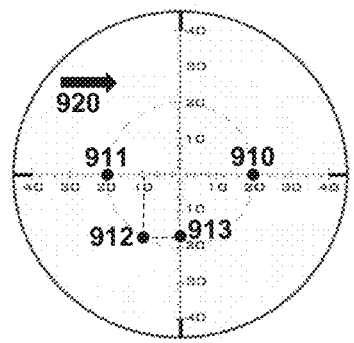
FIG. 18 shows various offset positions achieved by using non-zero markings on the wedge, with 910 and 911 being the "1.0" clock marking, and 912 and 913 being depicted to describe the motion of the image with one of the wedge "0.5" clock markings.

The amplitude and direction of windage is certainly unpredictable so a few other cases should be discussed. In the first example of windage adjust, the case of 18 MOA wind effects were adjusted with wedge implementation onto the scope. It started with the target at position 910 in FIG. 18 of the target (previously shown in FIG. 17b) once the wedge was put onto the scope for that specific example, which was setting the wedge to the full extent of thread travel in this wedge example. It is important to understand that the threads are not necessarily the same for all wedges and that every wedge should be adjusted separately.

The next example is very simple when compared to the first, as it will be the same 18 MOA wind 920 but in the other direction. In this case, the wedge would be threaded all the way into place, and then rotated back out about ½ turn to get the target to the position marked 911 in FIG. 18. In essence, any wind from right to left will start with the wedge target being located on the right side of the scope, while any wind from left to right, as in this second example, the target should begin on the left side of the reticle.

The last example is used in cases where the MOA of a given wedge is beyond the MOA impact of the wind but the user would still like to account for it using a wedge. This example would be a 10 MOA wind and the wedge is still a 20 MOA wedge. Using sine and cosine relationships, to achieve a 0.5 factor (10 MOA wind compared to 20 MOA wedge) on the cosine axis, the sine axis would result in a 0.866 factor, or 20 MOA X 0.866=17.32 MOA. Since the wedge will revolve in this designed 20 MOA circle, the user could go through the same steps as the 18 MOA wind from left to right as shown on position 911 in FIG. 18 and instead start at position 912 shown in FIG. 18 for a 10 MOA shift. The only additional step would be the user would have to account for the 17.32 MOA shift caused by the circular pattern on the wedge to be able to shift the target back to the origin and not leave it on the "Y" axis at 17.32 MOA below the origin, as shown for effect on position 913 in FIG. 18.

Alternative Embodiments Using Multiple Wedges

Figure 10:
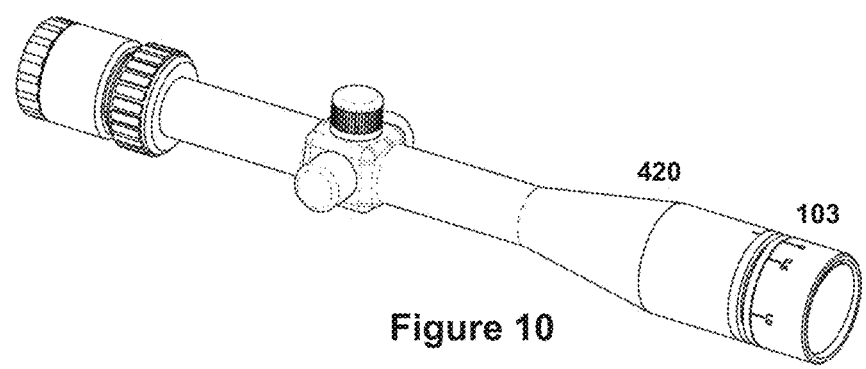
FIG. 10 is a collapsed view showing the wedge assembly 103 once the rings (101 and 102) and the wedge 100 are mounted on example scope 420 (shown here with zero position aligned to the scope 420 to produce a purely vertical shift of the image).
Figure 11:
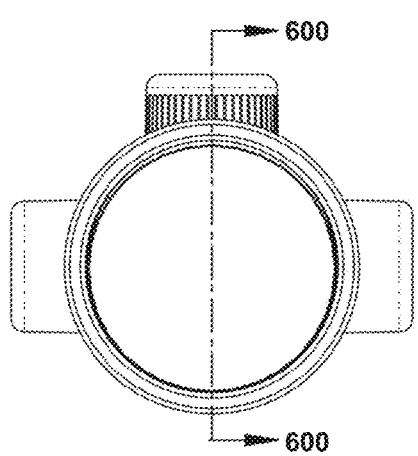
FIG. 11 is intended to depict the cross sectional view 600 of the assembled wedge 103 on example scope 420.
Figure 12:
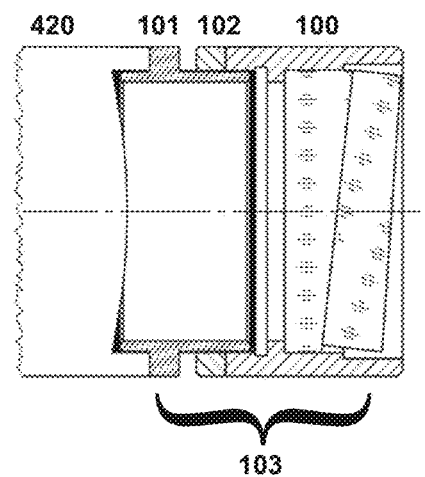
FIG. 12 shows the cross sectional view in FIG. 11, 600 of an assembled wedge 103 onto example scope 420, with glass shown to be positioned such that the zero position is being used based on the direct downward facing glass of wedge 100.

Consider the function of a single wedge on a scope as shown in FIG. 10. Full rotation of the wedge about the FOV axis enables the user to view any portion of a translated FOV with an offset defined by the offset of the wedge. A simple analogy would be that of a flashlight and what can be seen in a dark area depending on how it is used. A flashlight with no motion only lights a circular area straight ahead, similar to the FOV of a scope; when the flashlight is moved in circular motion around that same center and with a wedge defined offset, more FOV is seen as the flashlight is moved, but with the same diameter as the static flashlight. Now consider a second wedge which also rotates in circular motion, but attached to the first wedge. One can widen the effective FOV by rotating both wedges to their farthest point in any direction, but you can also now center the FOV of the light anywhere within that outer diameter limit defined by the sum of the offset of the two wedges, whereas before, with only one wedge, you were limited to traveling on that diameter formed by the offset of the single wedge.

Figure 19:
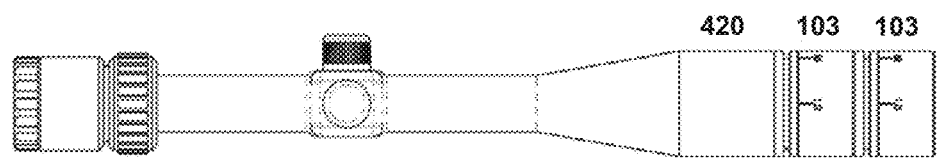
FIGS. 19 through 24 show alternative embodiments using multiple wedges (FIG. 19); the resulting rotational location FOVs as two wedges are rotated (both individually and in combination) in FIG. 20; the rotation location of both wedges at a direct downward offset position (FIG. 21); then the same rotation location as FIG. 21, except now rotated at 180 degrees (FIG. 22)
Figure 20:
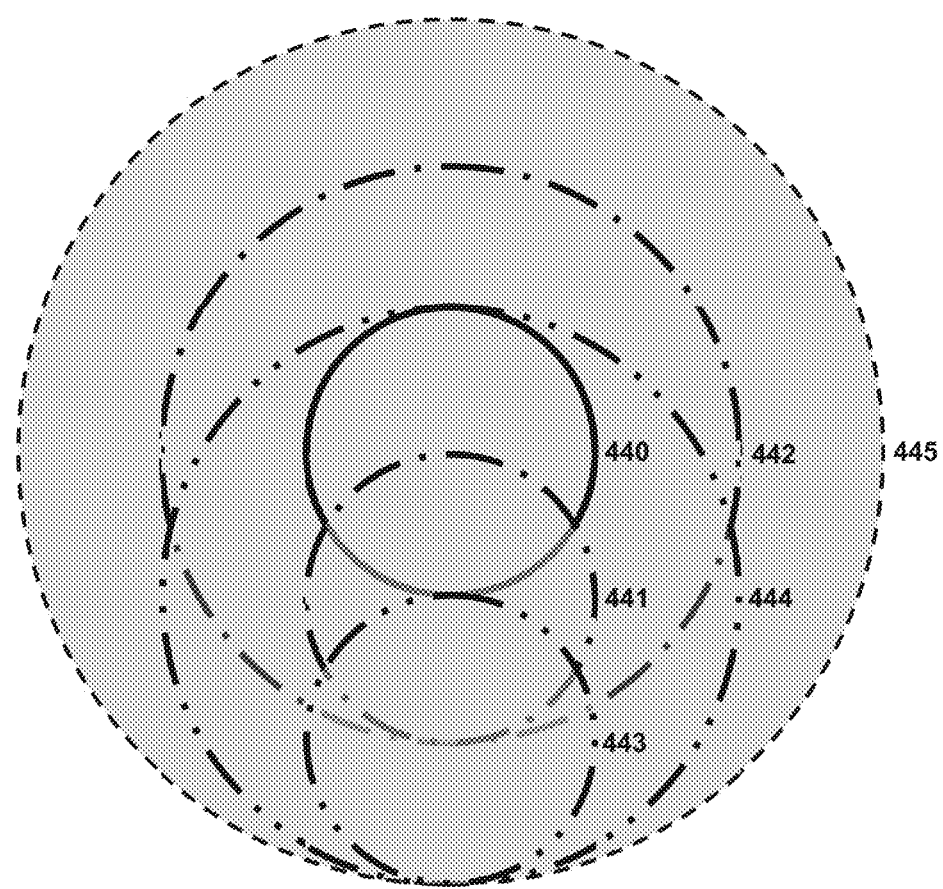

FIG. 19 depicts a double wedge 103 and 103 installed using a threaded adapter as before but duplicated onto an externally threaded first wedge. FIG. 20 is intended to depict how a two wedge assembly can perform. In this specific case, two wedge assemblies with offset designed to be exactly one half the FOV of the scope are utilized. FIG. 20 FOV 440 is the location of the FOV with no wedge present. Introduction of the first wedge rotated such that image drops directly downward results in FOV 441; if rotated one full 360 degrees from this point, the total comprehended FOV is depicted by the area in FOV 442. Note that the center of any FOV at any time with this first wedge will track along the same circle depicting FOV 440. Introducing the second wedge, with both of them installed such that they match in their rotation location, directly downward, the resulting FOV 443. Full 360 degree rotation of only this wedge comprehends a FOV depicted by 444, similar to how the first wedge alone performed, but it is now important to understand that if both wedges are allowed to rotate freely, any FOV shown within the FOV 445 is possible. The location of the FOV of the dual wedge system is no longer constrained to a radial location but instead can be adjusted to any location within 445.

Figure 21:
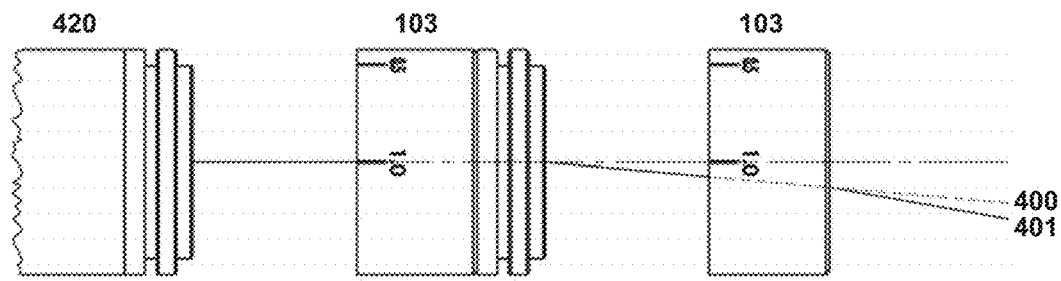
Figure 22:
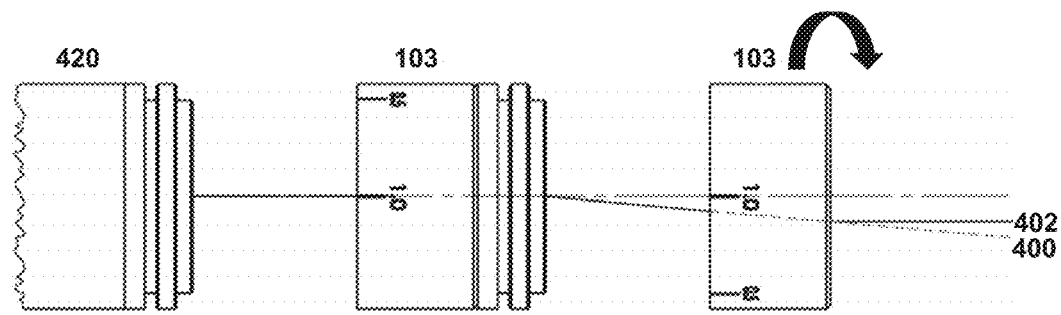
Figure 23:
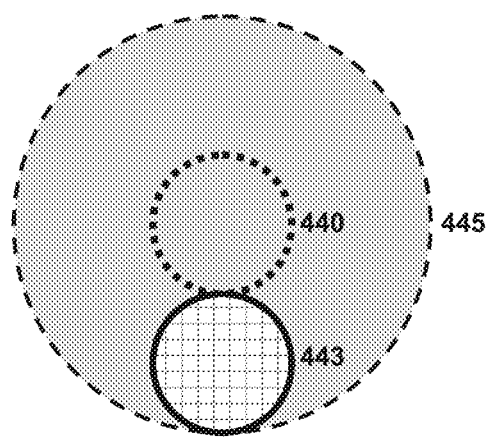
Figure 24:
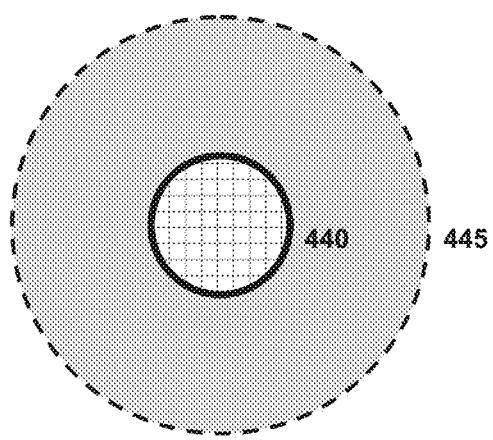
Figure 25:
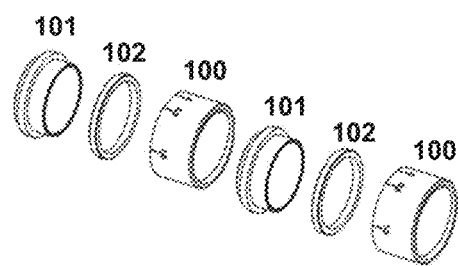
FIG. 25 is a perspective view of an exemplary embodiment of a selectable offset image wedge assembly with two wedges, showing clock markings around the threaded wedge 100 exterior, the threaded adaptor ring 101 and the threaded locking ring 102 of a preferred embodiment.

FIG. 21 shows one depiction of how a multiple wedge assembly might be utilized. A second wedge assembly 103 is added to the first wedge assembly 103 from FIG. 10. As shown, with both wedge assemblies installed rotationally for lowering the FOV, the resultant FOV would be as shown in FIG. 23, or one full diameter of offset. FIG. 22 now shows the outer wedge assembly rotated 180 degrees, and the resulting FOV 440 in FIG. 24 essentially nulls back to a no wedge FOV. This would be the case for any situation where the two wedges are rotated 180 degrees relative to each other.

The foregoing detailed description is to be clearly understood as given by way of illustration and example only, the spirit and the scope of this invention being limited solely by the claims.

What is claimed is:

1. A selectable offset image wedge assembly for use with an optical system, the optical system having a circular lens and an objective, the offset image wedge assembly comprising:

an adapter ring configured to mount to said objective;
a housing with a rear-facing end that mounts to said adapter ring, a forward-facing end with a circular wedge mounted therein such that the wedge outer surface diameter makes contact with an inner surface of the housing around the entirety of the wedge outer surface, said wedge being coaxially-aligned with the lens of the optical system, and a locking ring for locking the wedge to the adapter;
wherein the optical system receives an offset image from a ray bundle that has passed through the wedge; and
wherein the wedge is adjustable to allow said offset image to be locked into place using the locking ring at a specific clocking position;
and further wherein, the wedge is adjustable to any predetermined clocking position after detachment from the optical system, allowing repeated reattachment to the optical system to any predetermined clocking position.

2. The selectable offset image wedge assembly of claim 1, wherein said objective is threaded, and said adapter ring is threaded on at least one side and screws into said objective thread.

3. The selectable offset image wedge assembly of claim 2, wherein at least one more circular wedge is coaxially aligned and mounted to said forward facing end of said wedge assembly and produces at least one more offset image.

4. The selectable offset image wedge assembly of claim 3, wherein said wedge and said at least one more circular wedge are adjustable independently.

5. The selectable offset image wedge assembly of claim 1, wherein said wedge is threaded on at least one side, said locking ring is threaded, and said adapter ring is threaded on at least one side; and said locking ring and said threaded wedge screw onto said threaded adapter ring.

6. The selectable offset image wedge assembly of claim 5, wherein at least one more circular wedge is coaxially aligned and mounted to said forward facing end of said wedge assembly and produces at least one more offset image.

7. The selectable offset image wedge assembly of claim 6, wherein said wedge and said at least one more circular wedge are adjustable independently.

8. The selectable offset image wedge assembly of claim 1, wherein said objective is threaded, said wedge is threaded on at least one side, said locking ring is threaded, and said adapter ring is threaded on at least one side; and said adapter ring screws onto said objective thread, and said locking ring and said threaded wedge screw onto said threaded adapter ring.

9. The selectable offset image wedge assembly of claim 8, wherein at least one more circular wedge is coaxially aligned and mounted to said forward facing end of said wedge assembly and produces at least one more offset image.

10. The selectable offset image wedge assembly of claim 9, wherein said wedge and said at least one more circular wedge are adjustable independently.

11. The selectable offset image wedge assembly of claim 1, wherein at least one more circular wedge is coaxially aligned and mounted to said forward facing end of said wedge assembly and produces at least one more offset image.

12. The selectable offset image wedge assembly of claim 11, wherein said wedge and said at least one more circular wedge are adjustable independently.

* * * * *